United States Patent
Kinashi (10) Patent No.: US 9,787,153 B2
(45) Date of Patent: Oct. 10, 2017

(54) OUTER ROTOR TYPE DYNAMO

(71) Applicant: Ichinomiya Denki Co., Ltd., Hyogo (JP)

(72) Inventor: Yoshikazu Kinashi, Hyogo (JP)

(73) Assignee: Ichinomiya Denki Co., Ltd., Hyogo (JP)

( * ) Notice: Subject to any disclaimer, the term of this patent is extended or adjusted under 35 U.S.C. 154(b) by 287 days.

(21) Appl. No.: 14/817,897

(22) Filed: Aug. 4, 2015

(65) Prior Publication Data

US 2016/0043599 A1   Feb. 11, 2016

(30) Foreign Application Priority Data

Aug. 7, 2014   (JP) ................. 2014-161826
Oct. 14, 2014  (JP) ................. 2014-209728

(51) Int. Cl.
*H02K 1/27*   (2006.01)
*H02K 1/14*   (2006.01)
*H02K 3/34*   (2006.01)
*H02K 21/22*  (2006.01)

(52) U.S. Cl.
CPC .......... *H02K 1/2786* (2013.01); *H02K 1/145* (2013.01); *H02K 3/345* (2013.01); *H02K 21/22* (2013.01)

(58) Field of Classification Search
CPC ........ H02K 1/27–1/2793; H02K 1/145; H02K 1/146; H02K 3/345; H02K 3/325; H02K 3/525; H02K 1/14; H02K 1/16; H02K 21/22; H02K 2201/12

USPC .................. 310/67 R, 112, 114, 257, 156.02
IPC ......................................... H02K 001/12,001/14
See application file for complete search history.

(56) References Cited

U.S. PATENT DOCUMENTS

| | | | | |
|---|---|---|---|---|
| 5,962,938 A | * | 10/1999 | Bobay | H02K 1/187 310/156.26 |
| 2002/0158543 A1 | * | 10/2002 | Wolters | H02K 1/146 310/216.074 |
| 2002/0171305 A1 | * | 11/2002 | Coupart | B60K 7/0007 310/156.08 |
| 2009/0195090 A1 | * | 8/2009 | Rittenhouse | H02K 1/2786 310/44 |

FOREIGN PATENT DOCUMENTS

| | | |
|---|---|---|
| JP | 2001037108 A | 2/2001 |
| JP | 2004260921 A | 9/2004 |

* cited by examiner

*Primary Examiner* — Thomas Truong
(74) *Attorney, Agent, or Firm* — Marshall, Gerstein & Borun LLP (57) ABSTRACT

An outer rotor type dynamo has a first magnet and a second magnet which are disposed apart from each other in the axial direction, a first stator yoke disposed facing the inside of the first magnet with a gap, a second stator yoke disposed faced the inside of the second magnet with a gap, a hub shaft which magnetically connects the first stator yoke and the second stator yoke, a comb-like yoke in which both end portions of a plurality of projection pieces extending along the axial direction face different magnetic poles with respect to the first magnet and the second magnet, a bobbin disposed between the first stator yoke and the second stator yoke, and a coil wound around the bobbin.

20 Claims, 10 Drawing Sheets

OUTER ROTOR TYPE DYNAMO

BACKGROUND OF THE INVENTION

Field of the Invention

The present invention relates to an outer rotor type dynamo in which ring-like magnets rotate on the outside of a coil.

Description of the Related Art

Heretofore, a hub dynamo is known as an outer rotor type dynamo to be disposed in a wheel of a bicycle. In the hub dynamo, ring-like magnets are provided on the outside of a coil fixed to the shaft of the wheel. By the rotation of the magnets with the wheel, an induced voltage is generated in the coil. Around the coil, a claw pole-shaped stator yoke is provided. The stator yoke is configured by laminating electromagnetic steel plates (Japanese Patent Laid-Open No. 2001-37108 and Japanese Patent Laid-Open No. 2004-260921).

In the claw pole-shaped stator yoke, magnetic fluxes are concentrated on the root of each tooth portion extending in the axial direction. Therefore, each tooth portion is designed to have a shape in which the root is thick and the tip is thin. Therefore, the magnetic fluxes decrease on the tip portion of each tooth portion, so that an induced voltage generation efficiency decreases. In an aspect in which the stator yoke is not configured from laminated steel plates, an eddy current is likely to increase on the root side of each tooth portion.

Japanese Patent Laid-Open No. 2001-37108 discloses an aspect in which a stator yoke is configured from laminated steel plates. With the configuration disclosed in Japanese Patent Laid-Open No. 2001-37108, an eddy current is difficult to increase in each tooth portion. However, the size on the shaft side of the stator yoke (inner side in the radial direction) is shorter than the size on the outer side in the radial direction, and therefore the number of the electromagnetic steel plates which can be laminated is limited. Moreover, since the interval of each tooth portion is large on the outer side in the radial direction, an increase in the number of magnetic poles of a magnet facing each tooth portion is difficult to achieve. Furthermore, when the electromagnetic steel plates configuring the stator yoke have the same shape, the distance between the end surface of the electromagnetic steel plates and the magnets on the center side in the circumferential direction of the tooth portions which is the lamination direction of the electromagnetic steel plates is longer than the distance between the end surface and the magnets on both sides in the circumferential direction of the tooth portions. As a result, the induced voltage generation efficiency decreases.

SUMMARY OF THE INVENTION

The present invention has been made in view of the circumstances described above. It is an object of the present invention to provide an outer rotor type dynamo which enables an increase in the number of magnetic poles of magnets and has good power generation efficiency.

(1) The present invention relates to an outer rotor type dynamo in which ring-like magnets rotate on the outside of a coil. The outer rotor type dynamo has a first magnet and a second magnet which are disposed apart from each other in the axial direction of the ring shape and each magnet is magnetized so as to form multiple magnetic poles in the circumferential direction of the ring shape, a first magnet yoke disposed on the outside of the first magnet, a second magnet yoke disposed on the outside of the second magnet, a first stator yoke which is disposed facing the inside of the first magnet with a gap and in which a plurality of steel plates are laminated in the axial direction and tooth portions and space of the number corresponding to ½ of the number of magnetic poles of the first magnet each are alternately disposed in the circumferential direction corresponding to each magnetic pole of the first magnet, a second stator yoke which is disposed facing the inside of the second magnet with a gap and in which a plurality of steel plates are laminated in the axial direction and tooth portions and space of the number corresponding to ½ of the number of magnetic poles of the second magnet each are alternately disposed in the circumferential direction corresponding to each magnetic pole of the second magnet, a third stator yoke which magnetically connects the first stator yoke and the second stator yoke, a forth stator yoke in which a plurality of projection pieces extending along the axial direction each face the inside of each of the first magnet and the second magnet with a gap and disposed in each space of the first stator yoke and each space of the second stator yoke and both end portions in the axial direction of each projection piece face different magnetic poles with respect to the first magnet and the second magnet, an insulating bobbin disposed between the first stator yoke and the second stator yoke in the axial direction, and a coil which is wound in the circumferential direction in the bobbin.

The first magnet and the second magnet integrally rotate in a state of facing the first stator yoke and the second stator yoke, respectively. When the first magnet and the second magnet are located at a certain rotation position, each tooth portion of the first stator yoke is located at a position facing the same magnetic pole of the first magnet, i.e., the N pole or the S pole. Magnetic fluxes from the first magnet reach each tooth portion of the second stator yoke from each tooth portion of the first stator yoke through the third stator yoke. Each tooth portion of the second stator yoke faces a different magnetic pole in the second magnet, i.e., the S pole or the N pole. One end portion of the forth stator yoke faces a position adjacent to a different magnetic pole in the second magnet. Both end portions of the forth stator yoke face the different magnetic poles with respect to the first magnet and the second magnet. For example, when one end portion of the forth stator yoke faces the N pole of the second magnet, the other end portion faces the S pole of the first magnet. Thus, magnetic fluxes from the first magnet pass through the first stator yoke, the third stator yoke, the second stator yoke, the second magnet, and the forth stator yoke in this order, and then return to the first magnet. A ring of the magnetic fluxes arises around the coil and the magnetic fluxes around the coil alternately change due to the rotation of the first magnet and the second magnet, whereby an induced voltage is generated in the coil.

(2) Preferably, the first magnet and the second magnet each are configured by arranging a plurality of permanent magnets in a ring shape with a gap in the circumferential direction, in which the magnetic poles facing with the gap in the permanent magnets adjacent to each other in the circumferential direction are the same.

With the configuration, the permanent magnets configuring the first magnet and the second magnet are fixed apart from each other at equal intervals in the circumferential direction on the inner side of each of the first magnet yoke and the second magnet yoke.

(3) The present invention relates to an outer rotor type dynamo in which ring-like magnets rotate on the outside of a coil. The outer rotor type dynamo has a first magnet and a second magnet which are disposed apart from each other in the axial direction of the ring shape and each magnet is magnetized so as to form multiple magnetic poles in the circumferential direction of the ring shape, a magnet yoke which is disposed on the outside of the first magnet and the second magnet and magnetically connected to each of the first magnet and the second magnet, a first stator yoke which is disposed facing the inside of the first magnet with a gap and in which a plurality of steel plates are laminated in the axial direction and tooth portions and space of the number corresponding to ½ of the number of magnetic poles of the first magnet each are alternately disposed in the circumferential direction corresponding to each magnetic pole of the first magnet, a second stator yoke which is disposed facing the inside of the second magnet with a gap and in which a plurality of steel plates are laminated in the axial direction and tooth portions and space of the number corresponding to ½ of the number of magnetic poles of the second magnet each are alternately disposed in the circumferential direction corresponding to each magnetic pole of the second magnet, a third stator yoke which magnetically connects the first stator yoke and the second stator yoke, a forth stator yoke in which a plurality of projection pieces extending along the axial direction each face the inside of each of the first magnet and the second magnet with a gap and disposed in each space of the first stator yoke and each space of the second stator yoke and both end portions in the axial direction of each projection piece face a different magnetic pole with respect to the first magnet and the second magnet, an insulating bobbin disposed between the first stator yoke and the second stator yoke in the axial direction, and a coil which is wound in the circumferential direction in the bobbin. The first magnet and the second magnet are configured by magnetizing both end portions on both sides in the axial direction in a ring-like magnet component and a portion between the first magnet and the second magnet in the magnet component is not magnetized.

The first magnet and the second magnet integrally rotate in a state of facing the first stator yoke and the second stator yoke, respectively. When the first magnet and the second magnet are located at a certain rotation position, each tooth portion of the first stator yoke is located at a position facing the same magnetic pole of the first magnet, i.e., the N pole or the S pole. Magnetic fluxes from the first magnet reach each tooth portion of the second stator yoke from each tooth portion of the first stator yoke through the third stator yoke. Each tooth portion of the second stator yoke faces a different magnetic pole in the second magnet, i.e., the S pole or the N pole. One end portion of the forth stator yoke faces a position adjacent to a different magnetic pole in the second magnet. Both end portions of the forth stator yoke face the different magnetic poles with respect to the first magnet and the second magnet. For example, when one end portion of the forth stator yoke faces the N pole of the second magnet, the other end portion faces the S pole of the first magnet. Thus, the magnetic fluxes from the first magnet pass through the first stator yoke, the third stator yoke, the second stator yoke, the second magnet, and the forth stator yoke in this order, and then return to the first magnet. A ring of the magnetic fluxes arises around the coil and the magnetic fluxes around the coil alternately change due to the rotation of the first magnet and the second magnet, whereby an induced voltage is generated in the coil.

By assembling the magnet component to a predetermined position, the first magnet and the second magnet can be assembled to predetermined positions magnetically separated in the axial direction. Therefore, an operation of assembling the first magnet and the second magnet as the outer rotor type dynamo is facilitated.

(4) Preferably, the magnet yoke is an integrated member.

Since the magnet yoke is an integrated member, the number of components is reduced and an operation of assembling the magnet yoke to the magnet component is facilitated.

(5) Preferably, the magnet component is configured by arranging a plurality of permanent magnets in a ring shape with a gap in the circumferential direction and the magnetic poles facing with the gap in the permanent magnets adjacent to each other in the circumferential direction are the same.

With the configuration, the permanent magnets of the magnet component are fixed apart from each other at equal intervals in the circumferential direction on the inner side of the magnet yoke.

(6) Preferably, the magnetic poles of the first magnet and the second magnet are different from each other at the same position in the circumferential direction.

In this case, since the projection pieces in the forth stator yoke can be arranged along the axial direction, the structure of the outer rotor type dynamo is simplified.

(7) Preferably, each tooth portion projects in the radial direction of the ring shape from the central portion of each of the first stator yoke and the second stator yoke and each central portion has a first slit extending in the radial direction.

The first slit prevents the generation of an eddy current in the central portion of each of the first stator yoke and the second stator yoke.

(8) Preferably, the third stator yoke is a rod which penetrates the central portion of each of the first stator yoke and the second stator yoke in the axial direction and has a second slit extending in the radial direction.

The second slit prevents the generation of an eddy current in the circumferential direction of the third stator yoke.

(9) Preferably, the forth stator yoke has a connection portion which connects the plurality of projection pieces.

Thus, an operation of assembling the forth stator yoke to the outer rotor type dynamo is facilitated.

(10) Preferably, the number of magnetic poles of each of the first magnet and the second magnet is 36 magnetic poles or more.

Thus, an increase in the number of magnetic poles of the outer rotor type dynamo is realized.

(11) Preferably, the outer rotor type dynamo is further provided with a casing which is connected to the first magnet and the second magnet through the first magnet yoke and the second magnet yoke and is provided rotatably with respect to the third stator yoke.

Thus, the first magnet and the second magnet rotate with the casing.

(12) Preferably, the outer rotor type dynamo is further provided with a casing which is connected to the first magnet and the second magnet through the magnet yoke and is provided rotatably with respect to the third stator yoke.

Thus, the first magnet and the second magnet rotate with the casing.

(13, 14) Preferably, the third stator yoke is a hub of a bicycle and the casing has holes into which spokes of the bicycle are inserted.

Thus, the outer rotor type dynamo is realized as a hub dynamo.

The present invention can achieve an outer rotor type dynamo which enables an increase in the number of magnetic poles of the first magnet and the second magnet and has good power generation efficiency.

DESCRIPTION OF THE PREFERRED EMBODIMENTS

Hereinafter, a preferable embodiment of the present invention is described with reference to the drawings as appropriate. It is a matter of course that this embodiment is merely an example of the present invention and can be altered insofar as the scope of the present invention is not changed.

An outer rotor type dynamo 10 according to this embodiment is one in which a ring-like first magnet 11 and a ring-like second magnet 12 rotate on the outside of a coil 20. The outer rotor type dynamo 10 functions as a hub dynamo for bicycles. It is a matter of course that the hub dynamo for bicycles is merely an example of the use of the outer rotor type dynamo 10 and the outer rotor type dynamo 10 may be used for other uses.

Figure 1:
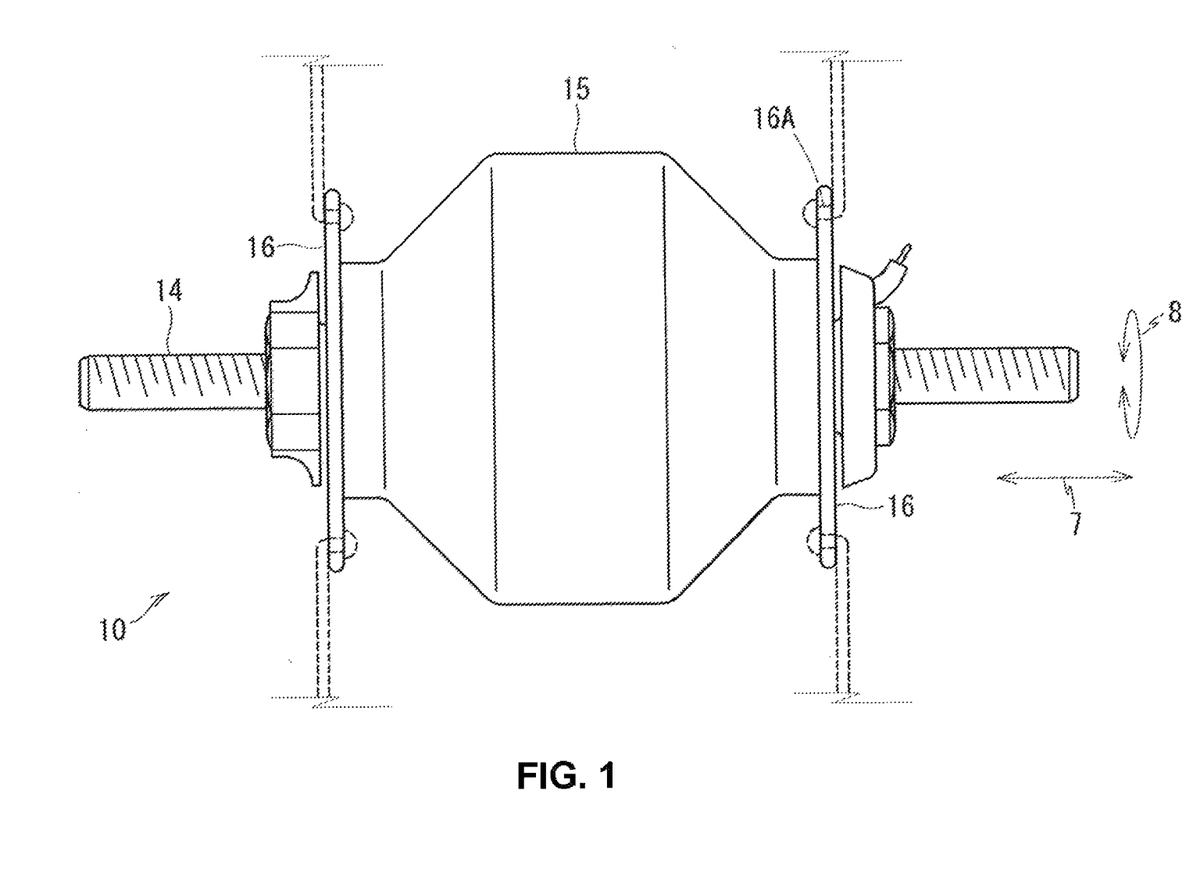
FIG. 1 is a front view of an outer rotor type dynamo 10 according to this embodiment.

As illustrated in FIG. 1, in the outer rotor type dynamo 10, a casing 15 is rotatably provided around a hub shaft (an example of the third stator yoke) 14 as the rotation shaft. The casing 15 has a cylindrical shape in which the central portion has a large diameter. Although not illustrated in each view, the casing 15 is rotatably provided in the hub shaft 14 through a ball bearing. Flanges 16 are provided on both sides in an axial direction 7 of the casing 15. In each flange 16, a plurality of holes 16A, into which spokes (illustrated by the dashed lines in FIG. 1) of a wheel of a bicycle are inserted, are provided side by side in a circumferential direction 8.

Figure 2:
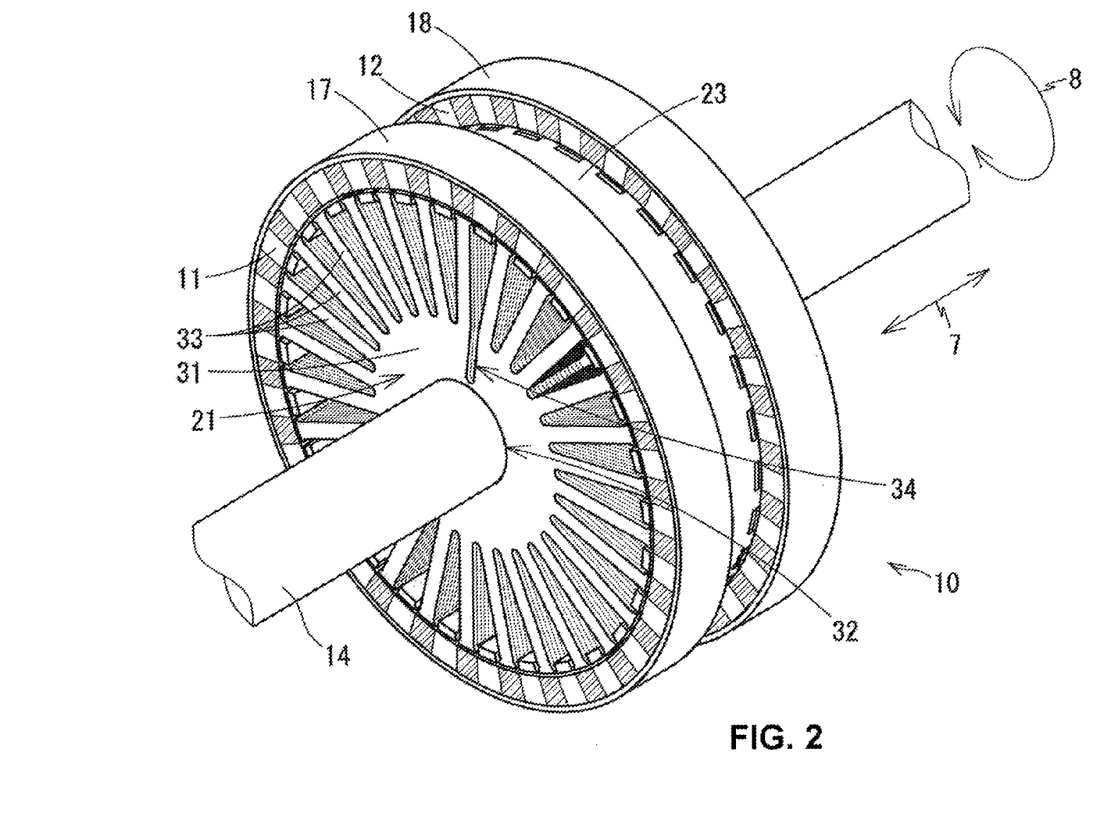
FIG. 2 is a perspective view illustrating the internal structure of the outer rotor type dynamo 10.
Figure 3:
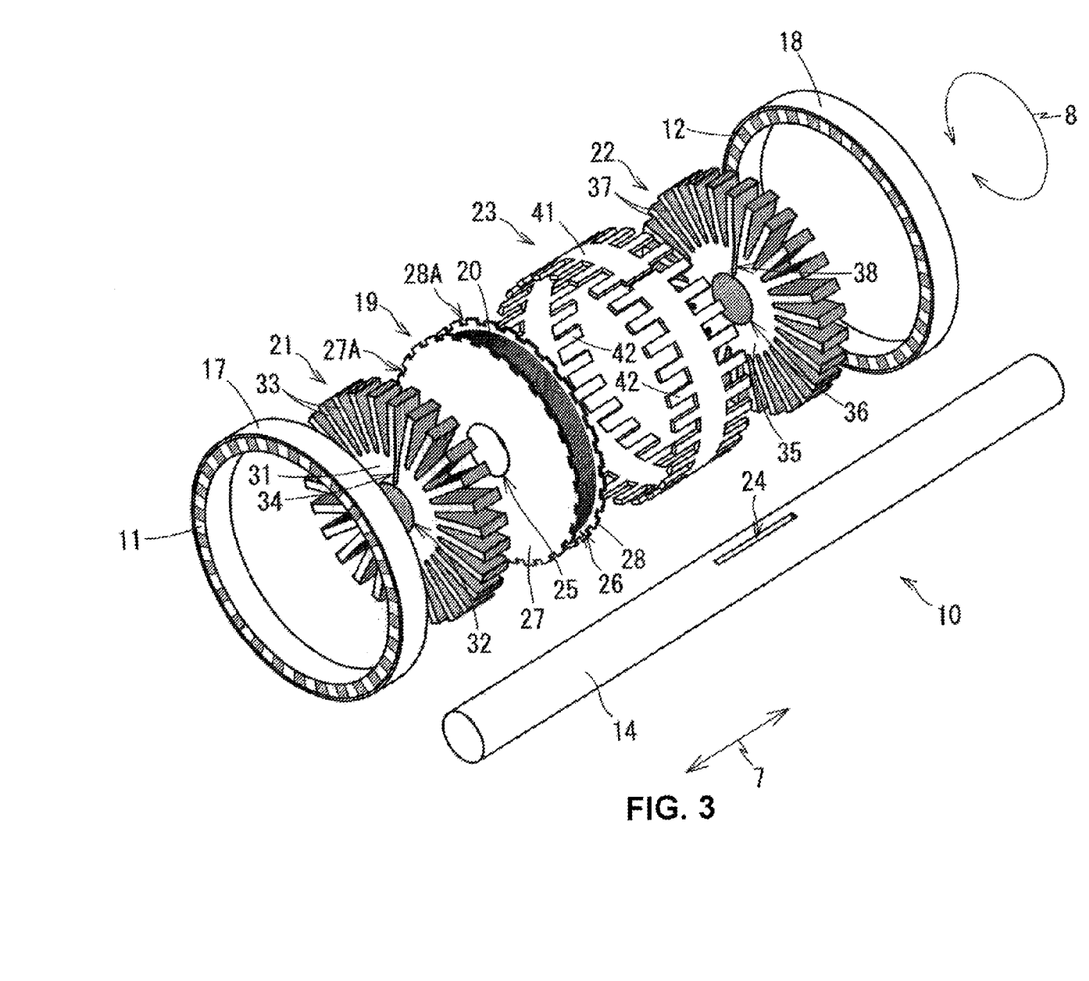
FIG. 3 is an exploded perspective view illustrating the internal structure of the outer rotor type dynamo 10.

As illustrated in FIG. 2 and FIG. 3, in the casing 15, a first magnet 11 and a second magnet 12, a first magnet yoke 17 and a second magnet yoke 18, a bobbin 19 and a coil 20, a first stator yoke 21, a second stator yoke 22, and a comb-like yoke (an example of the forth stator yoke) 23 are assembled. In FIG. 2 and FIG. 3, each magnetic pole of the first magnet 11 and the second magnet 12 is distinguished by the presence or absence of hatching for convenience.

The hub shaft 14 is a cylindrical rod. Although not illustrated in detail in each view, a screw thread is formed on both end portions of the hub shaft 14 in order to function as the shaft of a wheel of a bicycle. The hub shaft 14 is formed with a material having magnetic properties. As the material having magnetic properties, steel materials and the like are specifically mentioned. In the hub shaft 14, a slit (an example of the second slit) 24 dented in the radial direction is formed along the axial direction 7 in the central portion to which the bobbin 19, the first stator yoke 21, and the second stator yoke 22 are assembled. The slit 24 has a depth in which the slit 24 does not reach the center of the hub shaft 14. In the state where the bobbin 19, the first stator yoke 21, and the second stator yoke 22 are assembled to the hub shaft 14, the slit 24 has a length in which the slit 24 does not protrude to the outside in the axial direction 7 from the first stator yoke 21 and the second stator yoke 22. The hub shaft 14 may be provided with a slit and the like for drawing out a lead of the coil 20 as appropriate.

In the first magnet 11, the N pole and the S pole are alternately magnetized in a circumferential direction 8 on the inner surface side of the ring shape. The first magnet 11 has a ring shape as a whole. The first magnet 11 is configured from permanent magnets of 56 magnetic poles in one round. The first magnet 11 does not always need to form a ring shape as a unit. For example, as the first magnet 11, four arc-shaped permanent magnets may be combined with each other to form a ring shape. These four permanent magnets are held in the ring shape by being bonded to the inner surface of the ring-shaped first magnet yoke 17. The first magnet yoke 17 contains a material having magnetic properties, such as a steel plate, and is molded into a ring shape.

The second magnet 12 has the same structure as that of the first magnet 11. More specifically, the second magnet 12 has a ring shape as a whole and is configured from permanent magnets of 56 magnetic poles in one round. The second magnet yoke 18 has the same structure as that of the first magnet yoke 17 and is held in the ring shape by the second magnet 12 being bonded to the inner surface of the second magnet yoke 18.

The first magnet 11 and the second magnet 12 are fixed to the inner surface of the casing 15 through the first magnet yoke 17 or the second magnet yoke 18 disposed on the outside of the first magnet 11 and the second magnet 12, respectively. The first magnet 11 and the second magnet 12 are disposed apart from each other in the axial direction 7. Each magnetic pole in the circumferential direction 8 of the first magnet 11 and each magnetic pole in the circumferential direction 8 of the second magnet 12 are set to be different from each other. More specifically, when the inner surface of the first magnet 11 at a certain position in the circumferential direction 8 is the N pole, the inner surface of the second magnet 12 at the same position in the circumferential direction 8 is the S pole.

The bobbin 19 is assembled to the hub shaft 14. The bobbin 19 is a molded article of an insulating resin having a through-hole 25 into which the hub shaft 14 is inserted in the center. In the outer circumferential side of the bobbin 19, a recessed groove 26 continuous in the circumferential direction 8 is formed. The recessed groove 26 is space for accommodating the coil 20. On both sides in the axial direction 7 of the recessed groove 26, disk-shaped partitions 27 and 28 are provided. The coil 20 is separated from the first stator yoke 21 and the second stator yoke 22 in an insulated state by the partitions 27 and 28. The coil 20 is separated from the hub shaft 14 in an insulated state by the bottom of the recessed groove 26. A plurality of notches 27A and 28A dented in the radial direction are formed at intervals in the circumferential direction 8 in the peripheral edges of the partitions 27 and 28. The projection pieces 42 of the comb-like yoke 23 are fitted into the notches 27A and 28A.

The coil 20 configured by winding a lead is provided in the recessed groove 26 of the bobbin 19. The coil 20 is wound around the hub shaft 14 in the circumferential direction 8. Although not illustrated in each view, both end portions of the coil 20 are drawn out of the bobbin 19 to be extended to the outside of the casing 15. By electrically connecting an electric component, such as a light of a bicycle, to both end portions of the coil 20, an induced voltage generated in the coil 20 is supplied to the electric component.

The first stator yoke 21 is fixed to the hub shaft 14 in such a manner as to face the inside of the first magnet 11 with a gap. The first stator yoke 21 is configured by laminating a plurality of electromagnetic steel plates in the axial direction 7. Each electromagnetic steel plate has the same shape. The first stator yoke 21 has a disk shape as a whole in which a central portion 31 has a through-hole 32 into which the hub shaft 14 is inserted. From the peripheral edge of the central portion 31 of the first stator yoke 21, a plurality of tooth portions 33 radially project in the radial direction. The number of the plurality of tooth portions 33 is the number corresponding to ½ of the number of magnetic poles of the first magnet 11, i.e., 28 pieces.

In each tooth portion 33, the width along the circumferential direction 8 is fixed and the thickness along the axial direction 7 is fixed. There is space between each tooth portion 33. The tooth portions 33 and the space are alternately disposed along the circumferential direction 8. The interval in which the tooth portions 33 are separated from each other along the circumferential direction 8 corresponds to the magnetic pole of the first magnet 11. For example, when each tooth portion 33 faces the N pole of the first magnet 11, the space between the tooth portions 33 faces the S pole of the first magnet 11. One space between the tooth portions 33 extends to the vicinity of the through-hole 32 in the central portion 31 along the radial direction to form a slit (an example of the first slit) 34.

The second stator yoke 22 is fixed to the hub shaft 14 in such a manner as to face the inside of the second magnet 12 with a gap. The second stator yoke 22 is provided side by side with the first stator yoke 21 in the axial direction 7 with the bobbin 19 and the coil 20 interposed therebetween. The first stator yoke 21 and the second stator yoke 22 are magnetically connected through the hub shaft 14.

The second stator yoke 22 has the same shape as that of first stator yoke 21. More specifically, the second stator yoke 22 is configured by laminating a plurality of electromagnetic steel plates in the axial direction 7. Each electromagnetic steel plate has the same shape. The second stator yoke 22 has a disk shape as a whole in which a central portion 35 has a through-hole 36 into which the hub shaft 14 is inserted. From the peripheral edge of the central portion 35 of the second stator yoke 22, a plurality of tooth portions 37 radially project in the radial direction. The number of the plurality of tooth portions 37 is the number corresponding to ½ of the number of magnetic poles of the second magnet 12, i.e., 28 pieces.

In each tooth portion 37, the width along the circumferential direction 8 is fixed and the thickness along the axial direction 7 is fixed. There is space between each tooth portion 37. The tooth portions 37 and the space are alternately disposed along the circumferential direction 8. The interval in which the tooth portions 37 are separated from each other along the circumferential direction 8 corresponds to the magnetic pole of the second magnet 12. For example, when each tooth portion 37 faces the N pole of the second magnet 12, the space between the tooth portions 37 faces the S pole of the second magnet 12. One space between the tooth portions 37 extends to the vicinity of the through-hole 36 in the central portion 35 along the radial direction to form a slit (an example of the first slit) 38.

The comb-like yoke 23 is disposed on the outer side in the radial direction of the bobbin 19 in such a manner as to form an approximately cylindrical shape. The comb-like yoke 23 has a connection portion 41 having a flat belt shape continuous in the circumferential direction 8 and a plurality of projection pieces 42 projecting along the axial direction 7 from both end portions in the axial direction 7 of the connection portion 41. In other words, the plurality of projection pieces 42 are integrally connected by the connection portion 41. The connection portion 41 is disposed on the outside of the recessed groove 26 of the bobbin 19. The flat belt-shaped comb-like yoke 23 is curved in a cylindrical shape. The plurality of projection pieces 42 are positioned in the circumferential direction 8 by being fitted into the notches 27A and 28A of the partitions 27 and 28 of the bobbin 19.

The plurality of projection pieces 42 correspond to the space between the tooth portions 33 and 37 of the first stator yoke 21 and the second stator yoke 22, respectively. 28 pieces of the projection pieces 42 are disposed at intervals in the circumferential direction 8. Both end portions of each projection piece 42 project along the axial direction 7 from the bobbin 19 to thereby extend to the space between the tooth portions 33 and 37 of the first stator yoke 21 and the second stator yoke 22, respectively. Both end portions of each projection piece 42 face each of the first magnet 11 and the second magnet 12 with a gap in each space between the tooth portions 33 and 37, respectively.

Between one end portion of each projection piece 42 and each tooth portion 33 of the first stator yoke 21 located on both sides in the circumferential direction, a gap is formed. Similarly, between the other end portion of each projection piece 42 and each tooth portion 37 of the second stator yoke 22 located on both sides in the circumferential direction, a gap is formed.

The magnetic poles of the first magnet 11 and the second magnet 12 which both end portions of each projection piece 42 face are different from the magnetic poles of the first magnet 11 and the second magnet 12 which the tooth portions 33 and 37 of the first stator yoke 21 and the second stator yoke 22 face. For example, when the tooth portions 33 and 37 face the N poles of the first magnet 11 and the second magnet 12, both end portions of each projection piece 42 face the S poles of the first magnet 11 and the second magnet 12.

Power Generation by Outer Rotor Type Dynamo 10

The outer rotor type dynamo 10 generates an induced voltage in the coil 20 by rotating the first magnet 11 and the second magnet 12 on the outside of the first stator yoke 21 and the second stator yoke 22 to generate alternate magnetic fields around the coil 20.

Figure 4:
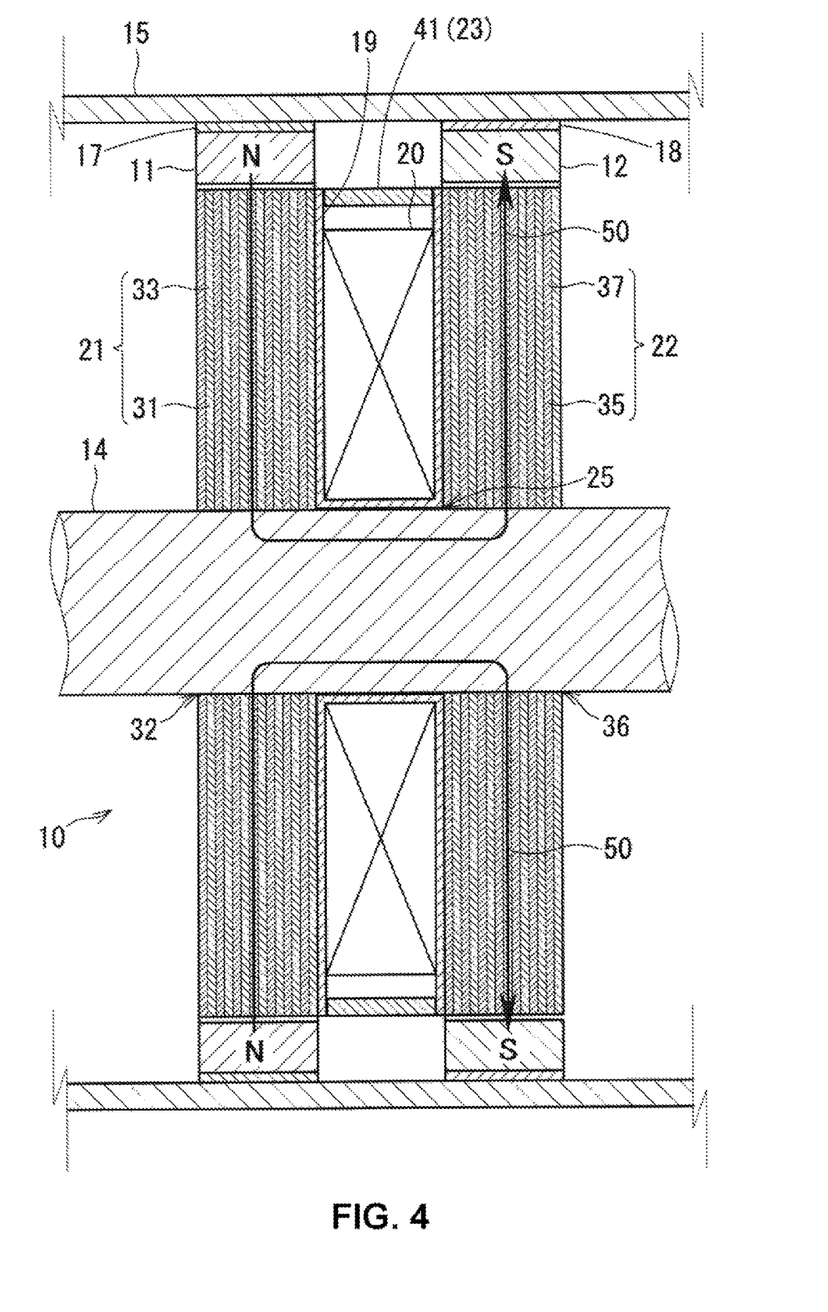
FIG. 4 is a partial cross sectional view illustrating the cross section in tooth portions 33 and 37 of the outer rotor type dynamo 10.

As illustrated in FIG. 4, when the first magnet 11 and the second magnet 12 are located at a certain rotation position, each tooth portion 33 of the first stator yoke 21 is located facing the N pole of the first magnet 11. A magnetic flux 50 from the first magnet 11 reaches each tooth portion 37 of the second stator yoke 22 from each tooth portion 33 of the first stator yoke 21 through the hub shaft 14. Each tooth portion 37 of the second stator yoke 22 faces the S pole of the second magnet 12.

Figure 5:
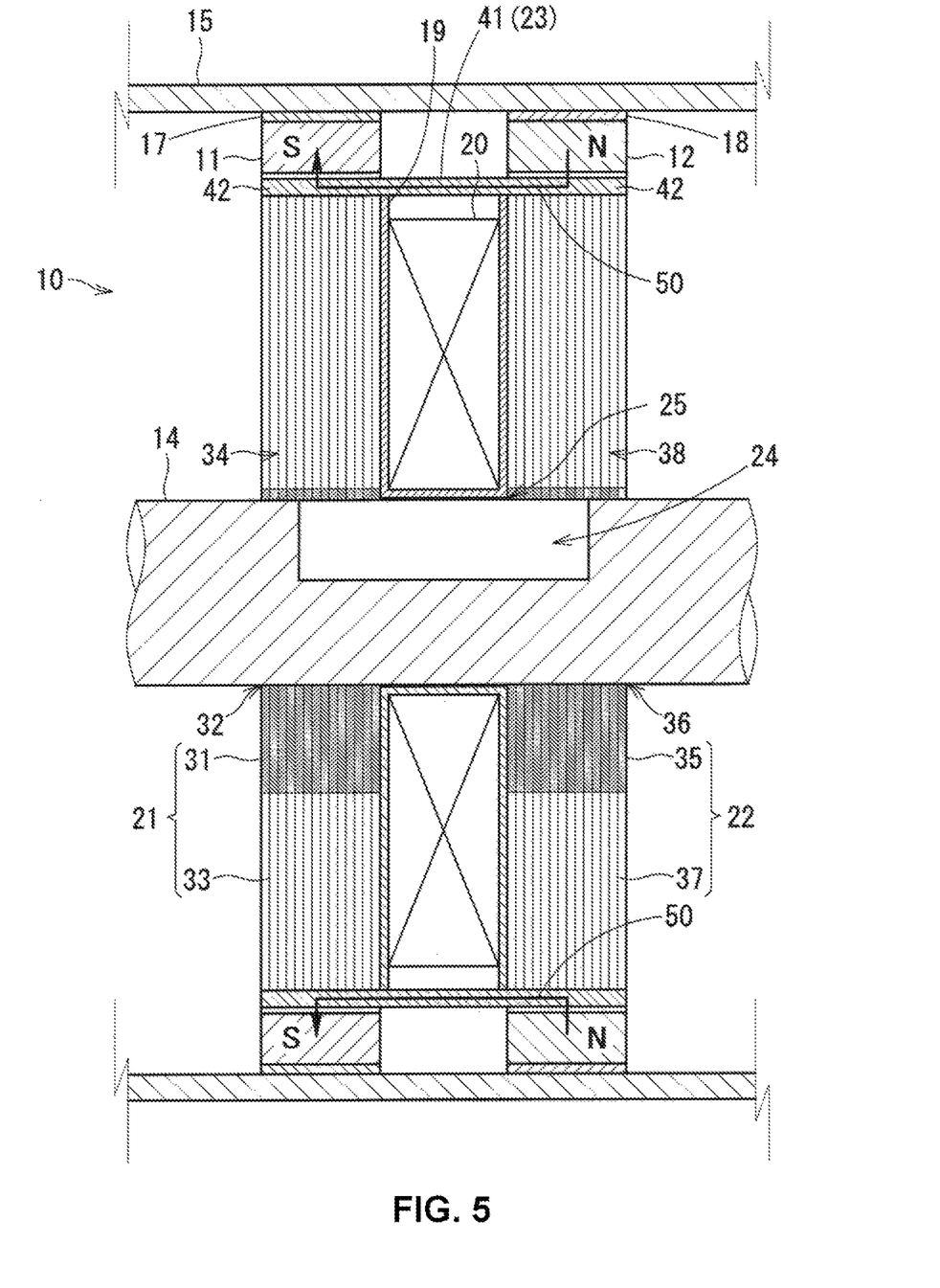
FIG. 5 is a partial cross sectional view illustrating the cross section in projection pieces 42 of the outer rotor type dynamo 10.

As illustrated in FIG. 5, one end portion of the projection piece 42 of the comb-like yoke 23 faces a position adjacent to the S pole of the second magnet 12, i.e., a position facing the adjacent N pole. The other end portion of the projection piece 42 faces the S pole of the first magnet 11 and the S pole is adjacent to the N pole of the first magnet 11 illustrated in FIG. 4. Therefore, the magnetic flux 50 travelling from the S pole to the adjacent N pole of the second magnet 12 travels to the S pole of the first magnet 11 through the projection piece 42 of the comb-like yoke 23, and then returns to the original N pole adjacent to the S pole. Thus, a ring of the magnetic flux 50 arises around the coil 20.

The magnetic flux 50 described above becomes an alternate magnetic field around the coil 20 by the rotation of the first magnet 11 and the second magnet 12 on the outside of the first stator yoke 21 and the second stator yoke 22, whereby an induced voltage is generated in the coil 20.

Operational Effects of this Embodiment

This embodiment can achieve the outer rotor type dynamo 10 which enables an increase in the number of magnetic poles of the first magnet 11 and the second magnet 12 and has good power generation efficiency. Moreover, the outer rotor type dynamo 10 can be realized as a hub dynamo.

Since the slit 34 is provided in the central portion 31 of the first stator yoke 21, the generation of an eddy current in the central portion 31 is suppressed. Similarly, since the slit 38 is provided in the central portion 35 of the second stator yoke 22, the generation of an eddy current in the central portion 35 is suppressed.

Since the slit 24 is provided in the hub shaft 14, the generation of an eddy current in the circumferential direction 8 of the hub shaft 14 is suppressed.

Since the comb-like yoke 23 has the connection portion 41 which connects the plurality of projection pieces 42, an operation of assembling the comb-like yoke 23 to the bobbin 19 to configure the outer rotor type dynamo 10 is facilitated.

Another Embodiment

In the embodiment described above, the first magnet 11 and the second magnet 12 each are configured as an independent structure but the configuration is not limited to such a configuration. More specifically, by individually magnetizing the end portions on both sides in the axial direction in a ring-like structure (magnet component), the first magnet 11 and the second magnet 12 may be configured. In this case, a configuration may be acceptable in which a magnet yoke is formed with a single magnetic body which is magnetically combined with each of the first magnet 11 and the second magnet 12, in place of the first magnet yoke 17 and the second magnet yoke 18.

When described in detail, as illustrated in FIG. 6 to FIG. 9, a magnet component 45 is formed in a ring shape with a material which can be magnetized. The end portions on both sides in the axial direction 7 in the magnet component 45 are locally magnetized. The end portions on both sides of the magnet component 45 serve as the first magnet 11 and the second magnet 12. In each of the first magnet 11 and the second magnet 12, the N pole and the S pole are alternately magnetized over the entire circumference along the circumferential direction and each of the first magnet 11 and the second magnet 12 configures 56 magnetic poles. In the magnet component 45, a portion between the first magnet 11 and the second magnet 12 is not magnetized. Therefore, in the magnet component 45, the first magnet 11 and the second magnet 12 are magnetically separated in the axial direction 7 through the portion which is not magnetized.

The magnet component 45 is supported by the inner circumferential surface of a single cylindrical magnet yoke 46. The magnet yoke 46 is a magnetic body in which a material having magnetic properties, such as a steel plate, is formed into a cylindrical shape. The magnet component 45 is fitted into the magnet yoke 46 which is an integrated member and is bonded to the inner circumferential surface of the magnet yoke 46. The magnet yoke 46 is magnetically combined with each of the first magnet 11 and the second magnet 12 in the magnet component 45. The magnet yoke 46 is fixed to the inner surface of the casing 15.

The configurations other than magnet component 45 and the magnet yoke 46 are the same as those of the above-described embodiment illustrated in FIG. 1 to FIG. 5. In the magnet component 45, the bobbin 19 and the coil 20, the first stator yoke 21, the second stator yoke 22, and the comb-like yoke 23 are accommodated while being assembled to the hub shaft 14.

Figure 6:
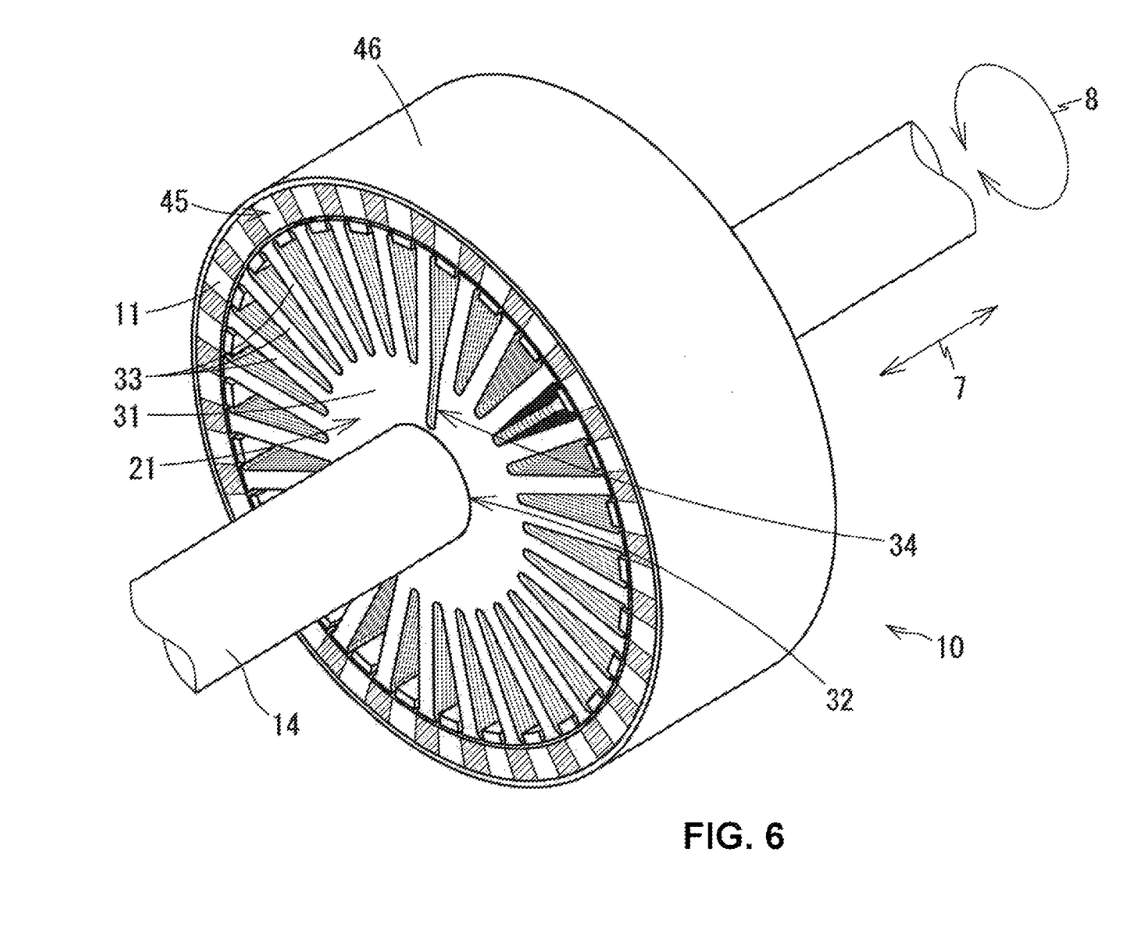
FIG. 6 is a perspective view illustrating the internal structure of an outer rotor type dynamo 10 according to another embodiment.
Figure 7:
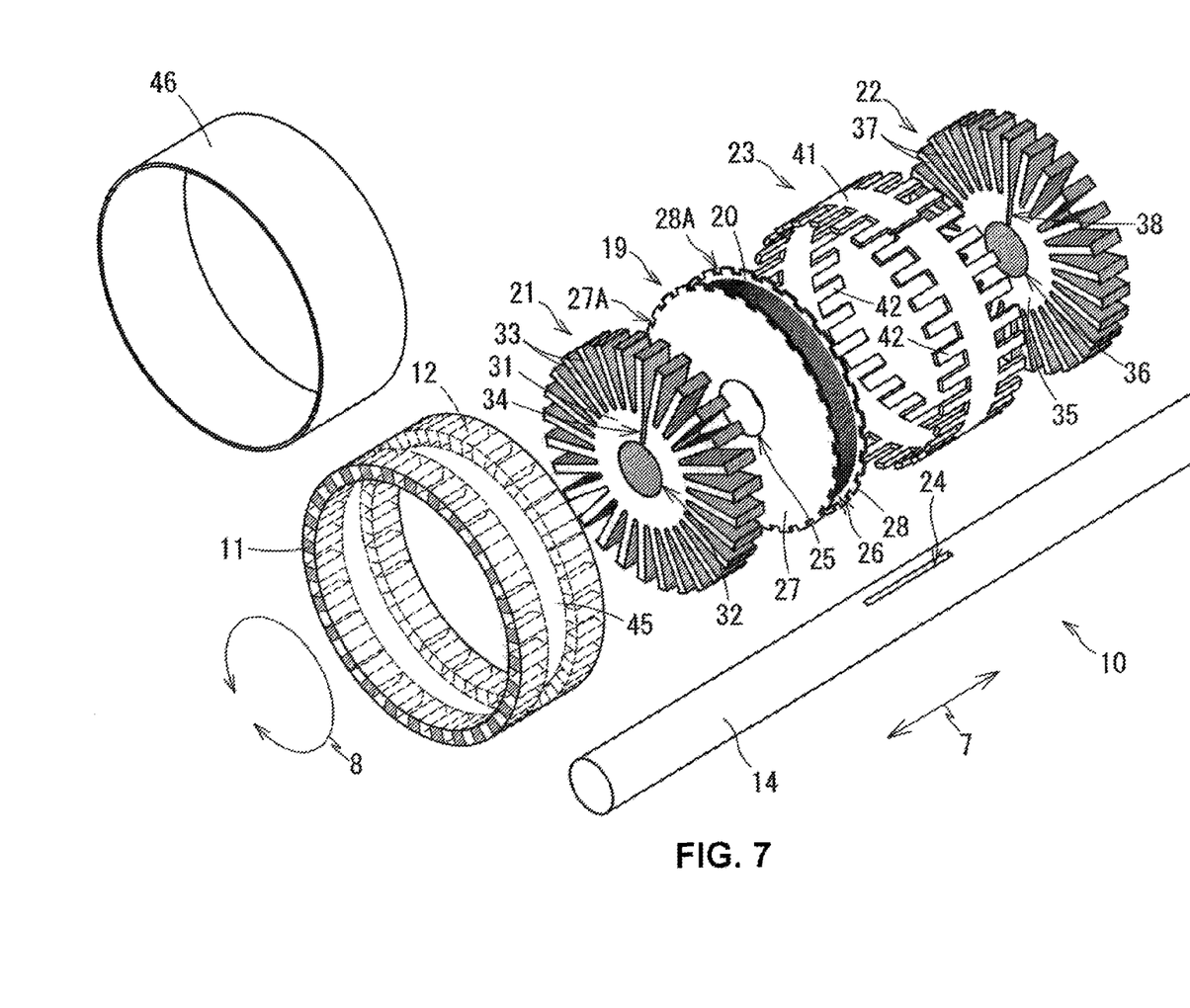
FIG. 7 is a perspective view illustrating the internal structure of the outer rotor type dynamo 10 according to another embodiment.
Figure 8:
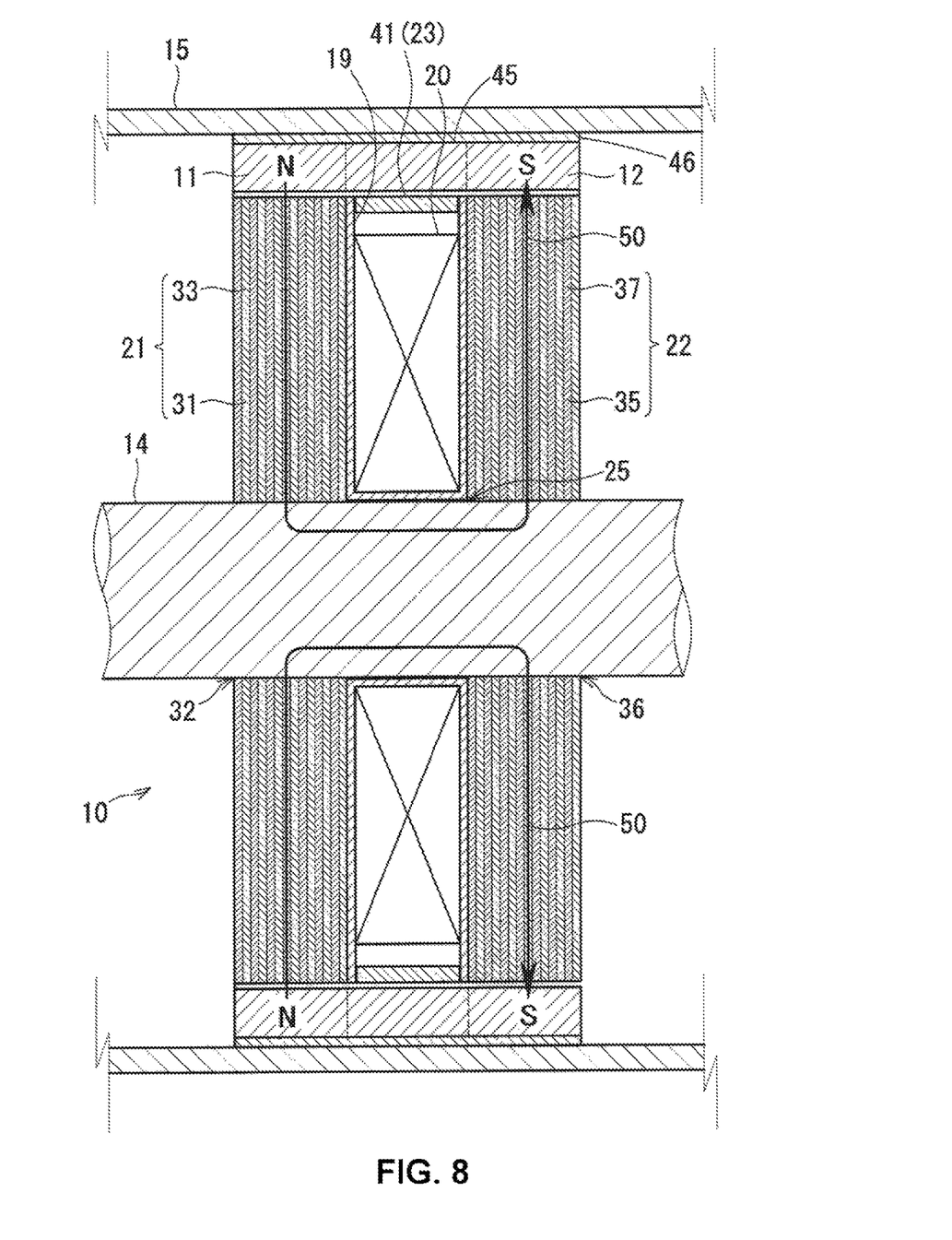
FIG. 8 is a partial cross sectional view illustrating the cross section in tooth portions 33 and 37 of the outer rotor type dynamo 10 according to another embodiment.
Figure 9:
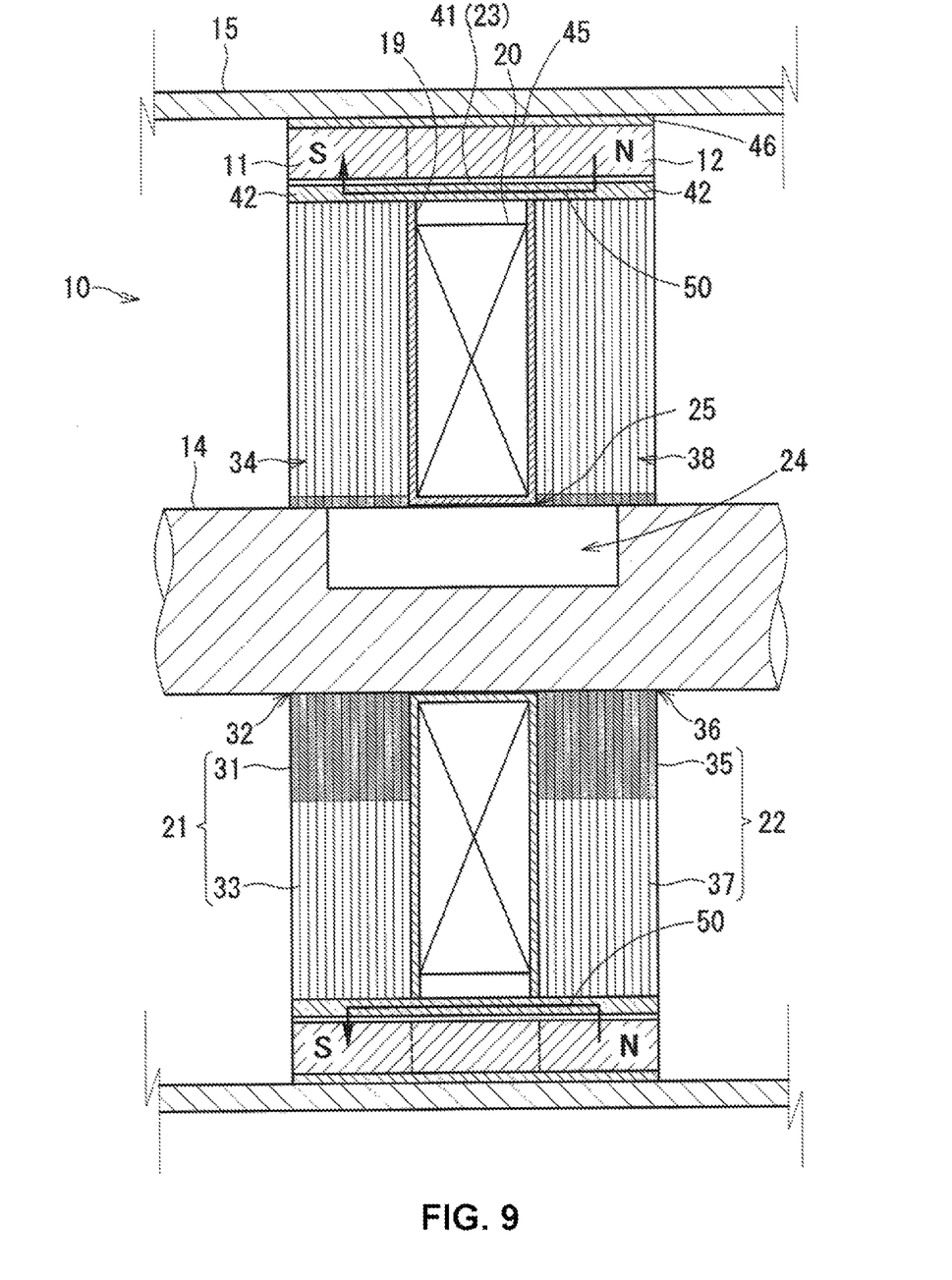
FIG. 9 is a partial cross sectional view illustrating the cross section in projection pieces 42 of the outer rotor type dynamo 10 according to another embodiment.

In FIG. 6, each magnetic pole (N pole and S pole) of the first magnet 11 is distinguished by the presence or absence of hatching for convenience. In FIG. 7 to FIG. 9, the boundary between each magnetic pole (magnetized region) in the first magnet 11 and the second magnet 12 is indicated by the dashed lines.

Also in another embodiment, a ring of magnetic fluxes can be formed around the coil 20 in the same manner as in the embodiment described above. Therefore, when the first magnet 11 and the second magnet 12 rotate on the outside of the first stator yoke 21 and the second stator yoke 22, the magnetic fluxes around the coil 20 are alternately changed, so that an induced voltage is generated in the coil 20. Thus, even when the first magnet 11 and the second magnet 12 are magnetically separated in the axial direction 7 by interposing the portion which is not magnetized therebetween and configured as an integrated component, the same operational effects as those of the embodiment described above are demonstrated.

In another embodiment, the first magnet 11 and the second magnet 12 are integrated as the magnet component 45. When the magnet component 45 is assembled to a predetermined position in the casing 15 through the magnet yoke 46, the first magnet 11 and the second magnet 12 are assembled apart from each other with only a predetermined distance in the axial direction 7. Therefore, the assembling operation is facilitated rather than the case where the first magnet 11 and the second magnet 12 each are individually assembled to the casing 15.

In another embodiment, a configuration may be acceptable in which the first magnet yoke 17 and the second magnet yoke 18 are used in the same manner as in the embodiment illustrated in FIG. 1 to FIG. 5, in place of the configuration of using the magnet yoke 46 which is a single magnetic body. In this case, the first magnet yoke 17 and the second magnet yoke 18 are magnetically combined with the first magnet 11 of the magnet component 45 and the second magnet 12, respectively.

Modification

Figure 10:
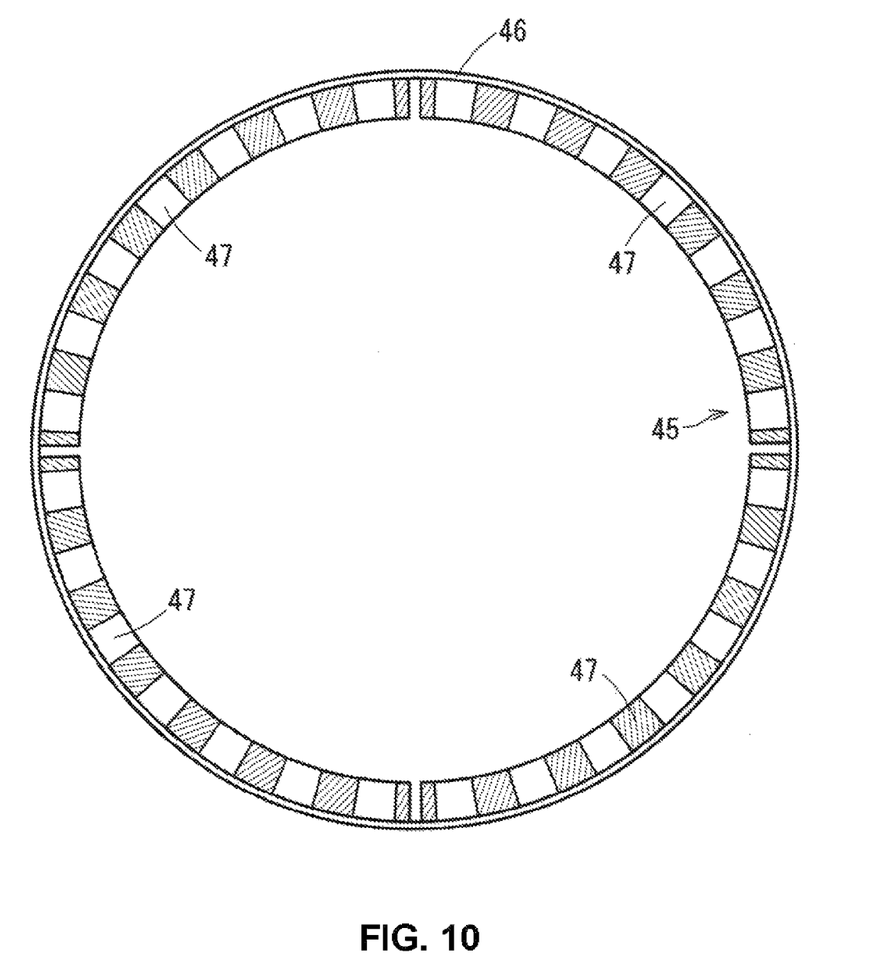
FIG. 10 is a front view of a magnet component and a magnet yoke of an outer rotor type dynamo 10 according to a modification.

In the embodiments described above, the first magnet 11 and the second magnet 12 or the magnet component 45 do not always need to form a cylindrical shape as a unit. Therefore, each magnet may be configured by arranging a plurality of permanent magnets in a ring shape with a gap in the circumferential direction. For example, as illustrated in FIG. 10, the magnet component 45 may be configured by arranging four permanent magnets 47 having the same arc shape in a ring shape. These four permanent magnets 47 are bonded to the inner surface of the ring-like magnet yoke 46 with an adhesive or the like in the state where the four permanent magnets 47 are separated with an equal gap in the circumferential direction. In the adjacent permanent magnets 47, the magnetic poles facing with the gap are the same.

In the case where, when each permanent magnet 47 is bonded to the inner surface of the magnet yoke 46 with an adhesive or the like, the strength of the magnetic force acting between the adjacent permanent magnets 47 through each gap varies, i.e., the gap is nonuniform, for example, the position in the circumferential direction of each permanent magnet 47 is displaced in such a manner that the magnetic force acting on the adjacent permanent magnets 47 is fixed before the adhesive or the like is cured. Thus, almost equal magnetic force acts on each permanent magnet from the adjacent permanent magnets 47, i.e., each gap is uniform, and thus each permanent magnet is fixed to the magnet yoke 46 by the curing of the adhesive or the like. As a result, each permanent magnet 47 bonded to the magnet yoke 46 is free from a possibility of separating from the magnet yoke 46 due to the action of the magnetic force from the adjacent permanent magnets 47, and thus is stably fixed to the inner surface of the magnet yoke 46.

Although a detailed description with reference to the drawings is omitted, the first magnet 11 and the second magnet 12 may also be similarly configured by arranging four arc-shaped permanent magnets in a ring shape with a gap in the circumferential direction, for example. In this case, the magnetic poles of the permanent magnets facing each other with the gap are the same.

Although the outer rotor type dynamo 10 having the first magnet 11 and the second magnet 12 of 56 magnetic poles is described in the embodiment described above, it is a matter of course that the number of magnetic poles of the first magnet 11 and the second magnet 12 may be increased or reduced. The number of magnetic poles of the first magnet 11 and the second magnet 12 is preferably 36 magnetic poles or more from the viewpoint of increasing the power generation efficiency.

Although the first magnet 11 and the second magnet 12 are disposed in such a manner that the magnetic poles facing each other in the circumferential direction 8 are different from each other in the embodiments described above, the magnetic poles do not always need to be different from each other. For example, when the first magnet 11 and the second magnet 12 are disposed in such a manner that the same magnetic pole faces in the circumferential direction 8, the magnetic poles of the first magnet 11 and the second magnet 12 which both end portions of each projection piece 42 face may be different from each other by forming the shape of each projection piece 42 of the comb-like yoke 23 into a crank shape or by letting each projection 42 project in such a manner as to become oblique to the axial direction 7.

Furthermore, the positions of the magnetic poles of the first magnet 11 and the positions of the magnetic poles of the second magnet 12 (boundary) do not need to be the same position in the circumferential direction and may be shifted in the circumferential direction. Also in this case, the magnetic poles of the first magnet 11 and the second magnet 12 which both end portions of each projection piece 42 face can be set to be different from each other by forming the shape of each projection piece 42 of the comb-like yoke 23 into a crank shape or by letting each projection 42 project in such a manner as to become oblique to the axial direction 7.

Although the outer rotor type dynamo 10 is realized as a hub dynamo in the embodiments described above, it is a matter of course that the outer rotor type dynamo 10 may be used for uses other than the hub dynamo.

What is claimed is:

1. An outer rotor type dynamo in which ring-like magnets rotate on an outside of a coil, the outer rotor type dynamo comprising:
    a first magnet and a second magnet which are disposed apart from each other in an axial direction of the ring shape and each magnet is magnetized so as to form multiple magnetic poles in a circumferential direction of the ring shape;
    a first magnet yoke disposed on an outside of the first magnet;
    a second magnet yoke disposed on an outside of the second magnet;
    a first stator yoke which is disposed facing an inside of the first magnet with a gap and in which a plurality of steel plates are laminated in the axial direction and tooth portions and space of a number corresponding to ½ of a number of magnetic poles of the first magnet each are alternately disposed in the circumferential direction corresponding to each magnetic pole of the first magnet;
    a second stator yoke which is disposed facing an inside of the second magnet with a gap and in which a plurality of steel plates are laminated in the axial direction and tooth portions and space of a number corresponding to ½ of a number of magnetic poles of the second magnet each are alternately disposed in the circumferential direction corresponding to each magnetic pole of the second magnet;
    a third stator yoke which magnetically connects the first stator yoke and the second stator yoke;
    a forth stator yoke in which a plurality of projection pieces extending along the axial direction each face an inside of each of the first magnet and the second magnet with a gap and disposed in each space of the first stator yoke and each space of the second stator yoke and both end portions in the axial direction of each projection piece face different magnetic poles with respect to the first magnet and the second magnet;
    an insulating bobbin disposed between the first stator yoke and the second stator yoke in the axial direction; and a coil which is wound in the circumferential direction in the bobbin.

2. The outer rotor type dynamo according to claim 1, wherein
    the first magnet and the second magnet each are configured by arranging a plurality of permanent magnets in a ring shape with a gap in the circumferential direction, and
    the magnetic poles facing with the gap in the permanent magnets adjacent to each other in the circumferential direction are the same.

3. The outer rotor type dynamo according to claim 2, further comprising a casing which is connected to the first magnet and the second magnet through the first magnet yoke and the second magnet yoke and is provided rotatably with respect to the third stator yoke.

4. The outer rotor type dynamo according to claim 1, wherein
    the magnetic poles of the first magnet and the second magnet are different from each other at a same position in the circumferential direction.

5. The outer rotor type dynamo according to claim 1, wherein each tooth portion projects in a radial direction of the ring shape from a central portion of each of the first stator yoke and the second stator yoke, and each central portion has a first slit extending in the radial direction.

6. The outer rotor type dynamo according to claim 5, wherein the third stator yoke is a rod which penetrates the central portion of each of the first stator yoke and the second stator yoke in the axial direction and has a second slit extending in the radial direction.

7. The outer rotor type dynamo according to claim 1, wherein the forth stator yoke has a connection portion which connects the plurality of projection pieces.

8. The outer rotor type dynamo according to claim 1, wherein the number of the magnetic poles of each of the first magnet and the second magnet is 36 magnetic poles or more.

9. The outer rotor type dynamo according to claim 1, further comprising a casing which is connected to the first magnet and the second magnet through the first magnet yoke and the second magnet yoke and is provided rotatably with respect to the third stator yoke.

10. The outer rotor type dynamo according to claim 9, wherein the third stator yoke is a hub of a bicycle, and the casing has holes into which spokes of the bicycle are inserted.

11. An outer rotor type dynamo in which ring-like magnets rotate on an outside of a coil, the outer rotor type dynamo comprising:

a first magnet and a second magnet which are disposed apart from each other in an axial direction of the ring shape and each magnet is magnetized so as to form multiple magnetic poles in a circumferential direction of the ring shape;

a magnet yoke which is disposed on an outside of the first magnet and the second magnet and magnetically connected to each of the first magnet and the second magnet;

a first stator yoke which is disposed facing an inside of the first magnet with a gap and in which a plurality of steel plates are laminated in the axial direction and tooth portions and space of a number corresponding to ½ of a number of magnetic poles of the first magnet each are alternately disposed in the circumferential direction corresponding to each magnetic pole of the first magnet;

a second stator yoke which is disposed facing an inside of the second magnet with a gap and in which a plurality of steel plates are laminated in the axial direction and tooth portions and space of a number corresponding to ½ of a number of magnetic poles of the second magnet each are alternately disposed in the circumferential direction corresponding to each magnetic pole of the second magnet;

a third stator yoke which magnetically connects the first stator yoke and the second stator yoke;

a forth stator yoke in which a plurality of projection pieces extending along the axial direction each face an inside of each of the first magnet and the second magnet with a gap and disposed in each space of the first stator yoke and each space of the second stator yoke and both end portions in the axial direction of each projection piece face different magnetic poles with respect to the first magnet and the second magnet;

an insulating bobbin disposed between the first stator yoke and the second stator yoke in the axial direction; and a coil which is wound in the circumferential direction in the bobbin, wherein the first magnet and the second magnet are configured by magnetizing both end portions on both sides in the axial direction in a ring-like magnet component, and a portion between the first magnet and the second magnet in the magnet component is not magnetized.

12. The outer rotor type dynamo according to claim 11, wherein the magnet yoke is an integrated member.

13. The outer rotor type dynamo according to claim 12, wherein the magnet component is configured by arranging a plurality of permanent magnets in a ring shape with a gap in the circumferential direction, and the magnetic poles facing with the gap in the permanent magnets adjacent to each other in the circumferential direction are the same.

14. The outer rotor type dynamo according to claim 12, further comprising a casing which is connected to the first magnet and the second magnet through the magnet yoke and is provided rotatably with respect to the third stator yoke.

15. The outer rotor type dynamo according to claim 11, further comprising a casing which is connected to the first magnet and the second magnet through the magnet yoke and is provided rotatably with respect to the third stator yoke.

16. The outer rotor type dynamo according to claim 15, wherein the third stator yoke is a hub of a bicycle, and the casing has holes into which spokes of the bicycle are inserted.

17. The outer rotor type dynamo according to claim 11, wherein the magnetic poles of the first magnet and the second magnet are different from each other at a same position in the circumferential direction.

18. The outer rotor type dynamo according to claim 11, wherein each tooth portion projects in a radial direction of the ring shape from a central portion of each of the first stator yoke and the second stator yoke, and each central portion has a first slit extending in the radial direction.

19. The outer rotor type dynamo according to claim 11, wherein the forth stator yoke has a connection portion which connects the plurality of projection pieces.

20. The outer rotor type dynamo according to claim 11, wherein the number of the magnetic poles of each of the first magnet and the second magnet is 36 magnetic poles or more.

* * * * *